Aug. 19, 1941.　　G. T. JOHNSON ET AL　　2,253,239
SPRING GROUP ARRANGEMENT
Filed Dec. 19, 1938　　2 Sheets-Sheet 1
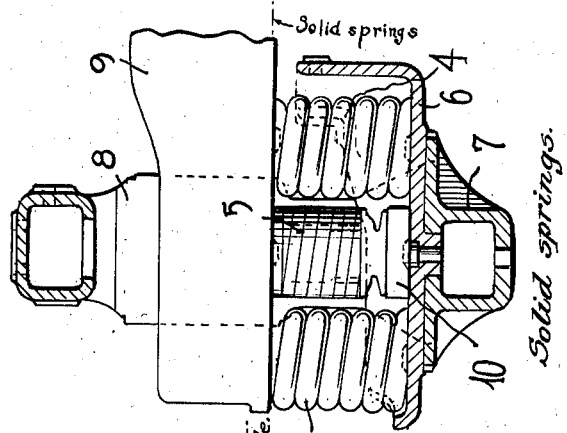
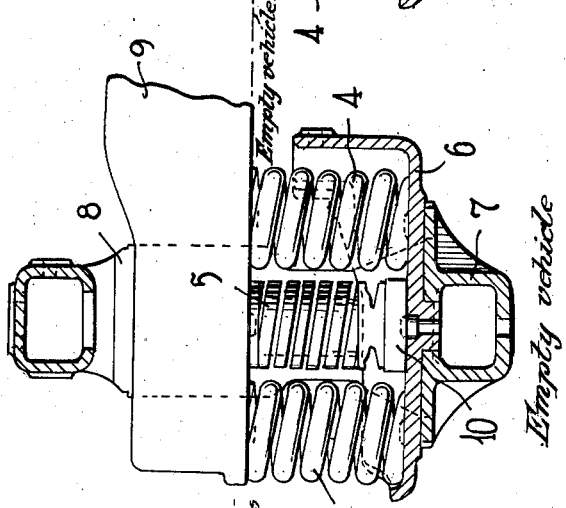
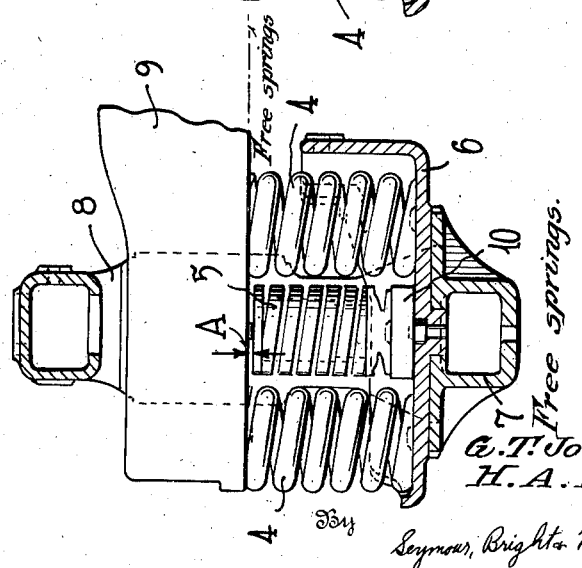
Inventors
G. T. Johnson,
H. A. Moeller,
By Seymour, Bright & Nottingham
Attorneys Aug. 19, 1941.    G. T. JOHNSON ET AL    2,253,239
SPRING GROUP ARRANGEMENT
Filed Dec. 19, 1938    2 Sheets-Sheet 2

Solid Springs.

Friction Spring.
Coil Springs.

Shaded area indicates travel range and capacity of friction spring.

Inventors
G. T. Johnson,
H. A. Moeller,

Patented Aug. 19, 1941

2,253,239

UNITED STATES PATENT OFFICE 2,253,239

SPRING GROUP ARRANGEMENT

George T. Johnson and Harry A. Moeller, Columbus, Ohio, assignors to The Buckeye Steel Castings Company, Columbus, Ohio Application December 19, 1938, Serial No. 246,750

1 Claim. (Cl. 267—4)

This invention relates to a spring group arrangement and more particularly to a spring group arrangement for use in railway car trucks.

It is well-known that coil or helical springs are subject to harmonic action at certain vibratory periods, which in railway vehicles is reached by passing over rail joints at critical speeds. This harmonic action causes excessive spring travel and "bouncing" of the vehicle on the coil springs and is detrimental to the riding qualities of the vehicle. It is therefore desirable to introduce some element in the coil spring group that will dissipate the work performed by the coil springs during the period of critical speeds and harmonic action thereby reducing the excessive spring travel to that of approximately normal travel thus providing an easy riding vehicle at all speeds.

Including a friction spring in combination with the coil springs is an accepted method of eliminating excessive coil spring travel due to harmonic action. However, for economical production the friction spring is made in one or two standard sizes and conforms with the design characteristics of one or two standard coil springs which are most universally used particularly in railroad service. These standard springs are set as to free height, total travel under compression and capacity. In some trucks it is desirable to use coil or helical springs whose free height and total travel exceeds the standard springs. In other words to provide a spring suspension for some vehicles producing the desired spring characteristics, requires the use of non-standard springs. But for the sake of economy and because the introduction of friction through the working heights of the coil springs will eliminate the detrimental harmonic action, we provide a novel means of combining non-standard helical springs and standard friction springs.

Our improved spring group arrangement will now be described in detail in connection with the accompanying drawings, in which:

Fig. 1 is a transverse vertical sectional view of a portion of a side frame and a side elevation of a portion of a bolster of a railway car truck with a portion of our improved spring group arrangement and showing the springs unloaded, that is, standing at full height.

Fig. 2 is a similar view and illustrating the coil springs when the coil springs have been partly compressed and the vehicle is empty.

Fig. 3 is a view like Fig. 1 but showing the springs compressed solid.

Figure 4:
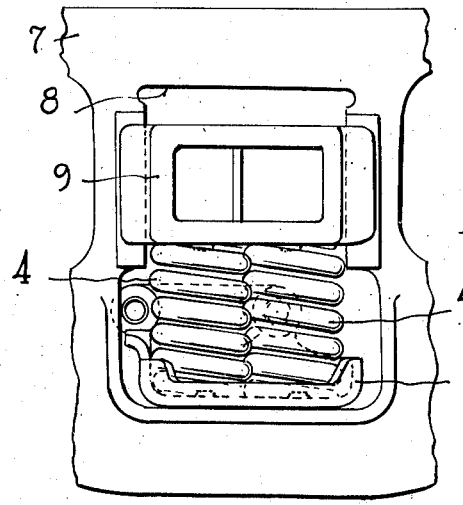
Fig. 4 is an end view of the bolster, spring group, and a portion of the side frame member, under empty vehicle load.
Figure 5:
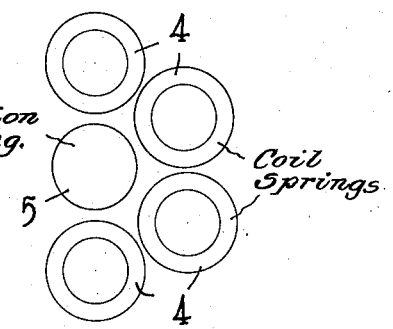
Fig. 5 is a diagrammatic top plan view of the spring group.

Referring to the drawings, 4 designates non-standard helical springs, and 5 a standard friction spring arranged in a group with the spring 5 preferably partially bounded by the springs 4. The group is carried by a spring seat 6 which rests on a side frame member 7 at the bottom of a bolster opening 8 of the latter. Obviously the spring seat is not essential to the invention as the springs could rest directly on the side frame. A bolster 9 is supported by the springs, and as is common with railway vehicles, the bolster is a supporting member of a vehicle body (not shown).

Under the condition of free springs (Fig. 1) it will be noted that the coil springs are considerably greater in height than the friction spring, and as previously mentioned, the total travel of the friction spring is less than that of the coils. In order to function properly all of the springs should go solid at the same time to utilize the full travel of both type of springs. To accomplish this, the friction spring is arranged in an elevated position due to the fact that its base rests on a pedestal or supporting block 10. By this means it is raised to within the distance A of the height of the coil springs and this distance equalizes the difference in total travel between the coil and friction springs.

Figs. 2 and 4 illustrate the spring group under the condition of empty vehicle in which all springs are substantially in contact with the bottom of the bolster.

Fig. 3 shows the group when solid and all the travel is taken up in both coil and friction springs.

Figure 6:
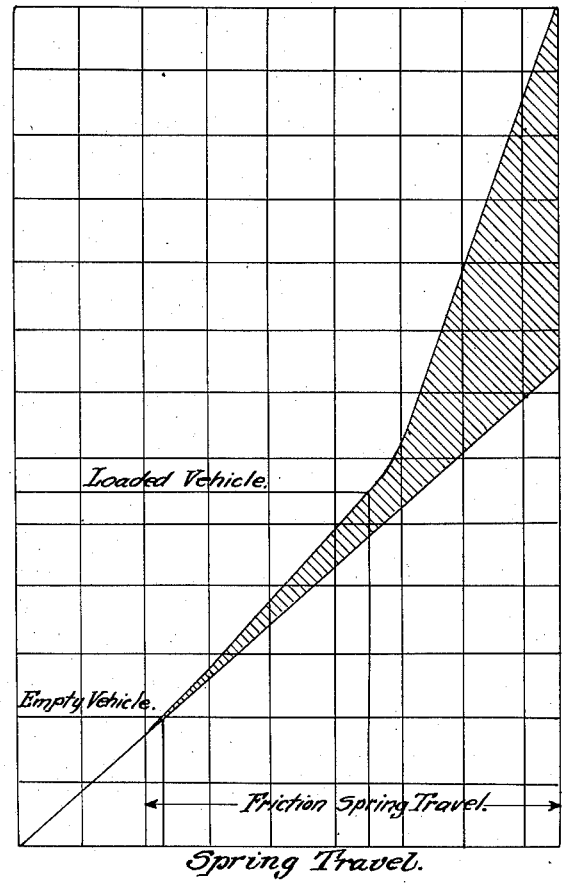
Fig. 6 is a diagram illustrating the action of the friction spring.

It will be noted that friction is not required in the spring group throughout the total travel range of the coils but only in the interval between the empty vehicle and solid spring travel. We have provided friction in this interval in this spring arrangement, as illustrated by the diagram in Fig. 6. The friction spring travel starts at a load slightly below the empty vehicle load and the friction spring and coils reach their solid travel at the same time. The horizontal dimension of the shaded portion of the diagram shows the travel of the friction spring, the vertical dimension shows its capacity, and the area of the shaded portion represents substantially the energy absorbed by the friction spring.

The block 10 may be an integral part of the spring seat or a separable block as shown. If a removable block is employed, of course, blocks of various heights may be used and friction springs of various heights substituted. The block, because of its size and shape, may be conveniently and economically hardened by heat treatment in order to reduce wear between its top surface and the bottom of the friction spring 5. Obviously friction springs of greater free height and travel than coil springs can be similarly combined by the method disclosed.

From the foregoing it is believed that our improved spring group arrangement and the advantages thereof may be readily understood by those skilled in the art, and we are aware that changes may be made in the details disclosed without departing from the spirit of the invention as expressed in the claim.

What we claim and desire to secure by Letters Patent is:

In a vehicle, a supporting member and a supported member, a group of non-standard helical springs and a standard friction spring supported by the supporting member and adapted to support the supported member, the friction spring being normally uncompressed and having a height less than any one of the helical springs when the springs are unloaded, none of the springs being compressed by means other than the load on the supported member, and a support for the friction spring, forming no part of that spring and supported by the supporting member for supporting the friction spring at sufficient height to be compressed after the supported member compresses the helical springs to a predetermined degree, all of the springs being arranged to go "solid" simultaneously.

GEORGE T. JOHNSON.
HARRY A. MOELLER.